United States Patent [19]

Brown

[11] Patent Number: 4,966,042
[45] Date of Patent: Oct. 30, 1990

[54] BALANCED RECIPROCATING MACHINES

[76] Inventor: Arthur E. Brown, R.D. #1, Box 1107, Lake George, N.Y. 12845

[21] Appl. No.: 306,835

[22] Filed: Feb. 6, 1989

[51] Int. Cl.⁵ .................... F16F 15/26; F16H 21/22
[52] U.S. Cl. ................................ 74/44; 74/603; 74/604
[58] Field of Search ............... 74/44, 603, 604; 123/56 AA, 56 BA, 192 B

[56] References Cited

U.S. PATENT DOCUMENTS

| | | | |
|---|---|---|---|
| 1,754,918 | 4/1930 | Walker | 74/603 |
| 4,095,579 | 6/1978 | Iwasa et al. | 74/603 X |
| 4,509,378 | 4/1985 | Brown | 74/44 |
| 4,556,026 | 12/1985 | Masuda et al. | 123/192 B |
| 4,632,072 | 12/1986 | Brogdon | 74/603 X |
| 4,756,674 | 7/1988 | Miller | 417/534 |

*Primary Examiner*—Allan D. Herrmann

[57] ABSTRACT

A large compressor has a four throw crankshaft, four connecting rods, four crossheads, and four horizontally opposed pistons. As usual, each piston is offset from its opposing piston and this causes the usual inertia force couples (primary couples and secondary couples). The crankshaft has counterweights thereon. A parallel oppositely rotating countershaft has balance weights thereon. These rotating weights balance the two primary inertia force couples. The crank sequence and the crosshead/piston locations are such that the two secondary inertia force couples counteract each other and no other secondary balancing device is needed. Further, the same counterweights also serve to balance the four crankpins and the large ends of the four connecting rods. Thus, the whole machine has near perfect balance with no unbalanced reciprocating primaries, reciprocating secondaries, primary couples, secondary couples, or rotating unbalance. The balancer parts can be retrofitted to existing compressor machines without removing the crankshaft from its frame or disturbing other compressor parts. Also, set forth is a lower cost partial balancing system with the same parts as above except the countershaft is omitted.

22 Claims, 8 Drawing Sheets

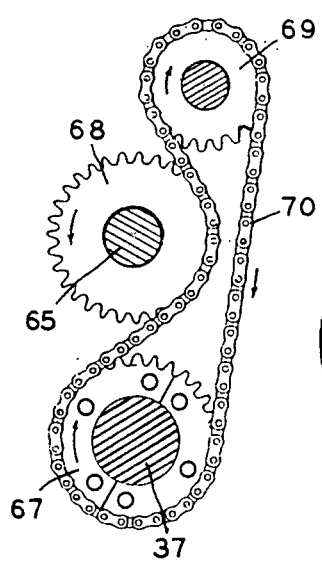
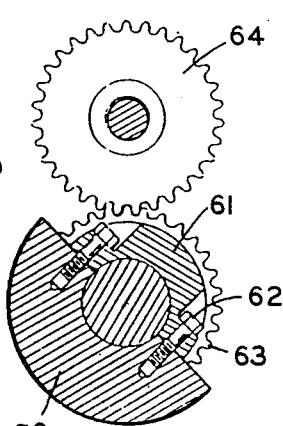
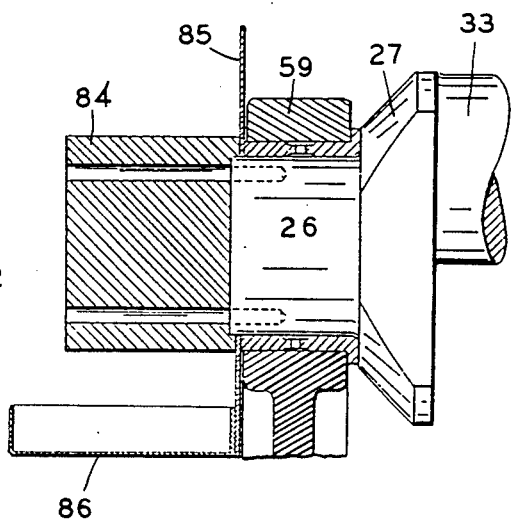
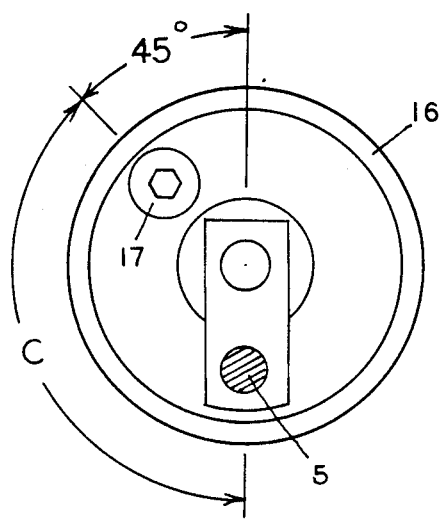
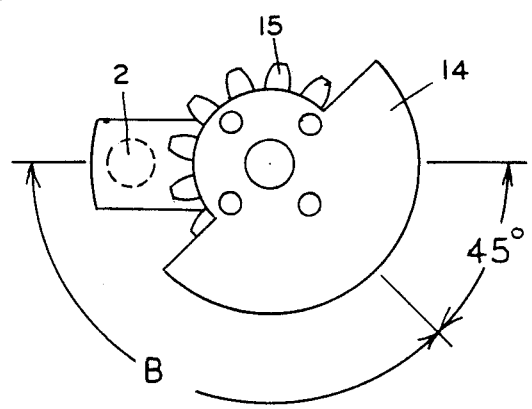
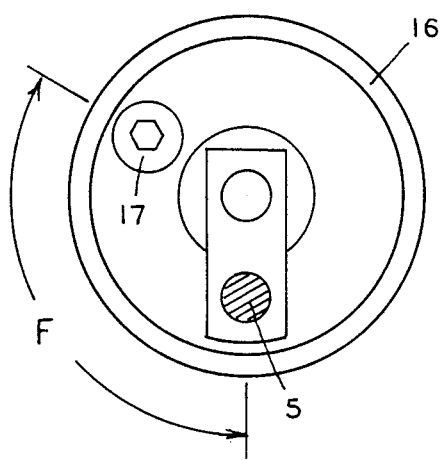
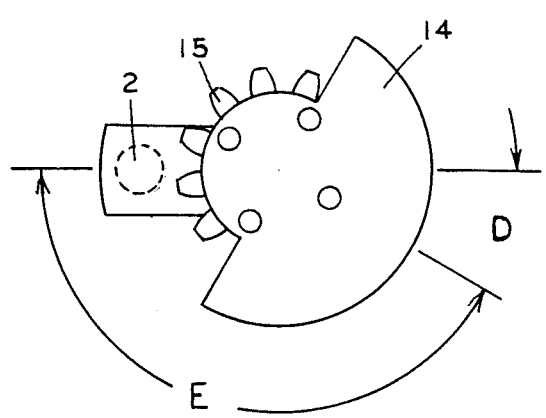

NEGATIVE RESULT

BALANCED RECIPROCATING MACHINES

INTRODUCTION

Large double acting reciprocating compressor machines are presently manufactured with pairs of horizontally opposed cylinders. In each pair, the pistons move outward at the same time and inward at the same time. Thus, primary and secondary reciprocating inertia forces are balanced. There still remains, however, unbalanced inertia force couples due to the fact that the two pistons (in each pair) are separated by the crank spacing along the crankshaft. Such force couples cause the machines to vibrate and shake—an undesirable situation.

DISCUSSION OF PRIOR ART

German patent No. DE 3307708A Puki et al, shows a two cylinder four stroke cycle internal combustion engine. The two cylinders are horizontally opposed. A Countershaft 12 has balance weights 21 thereon. The Puki engine has only two cylinders and thus unbalanced secondary couples remain. Suppose the Puki engine were doubled so as to have four cylinders instead of two. In that case, all four Puki crankpins must be in a common plane or otherwise there would be an uneven firing sequence. In that case, the secondary couples would be addative instead of subtractive—as in my invention.

U.S. Pat. No. 4,632,072 Brogdon shows and describes a four throw horizontally opposed engine with eight cylinders, eight pistons, and eight con (connecting) rods. Brogdon has four crankpins and each crankpin drives two con rods. Brogdon said nothing about secondary forces or couples. It is not necessary to have eight pistons total to balance secondary couples as my invention now does this with only four pistons and four con rods.

Referring to FIG. 1 of Brogdon, the counterweight 24 is diametrically opposite the crankpin 16 and this is an incorrect position for proper balance. Instead, the counterweight 24 of Brogdon should be 135 degrees from the closest crankpin 16 for proper balance. See my FIGS. 1 and 2 where counterweight 14 is at 135 degrees from crankpin 2.

Referring to FIG. 2 of Brogdon, rotate gears 30 and 32 counter-clockwise until weights 34 and 36 are on the bottom. Also, rotate gear 26 of Brogdon counter-clockwise (an equal number of degrees) until weight 28 is on the top. At this location, the combined force of weights 34 and 36 is vertically downward and through the axis 14 of the crankshaft. At this location, the force of weight 28 is vertically upward and through the axis of (not the crankshaft) gear 26. Thus, this force is offset and creates an unbalanced twisting couple.

Brogdon teaches at lines 3 to 5 and lines 24 to 31 of column 3 that the axes of his gears 26, 30, and 32 must lie in plane X of the pistons—and as shown in Brogdon's FIG. 1. Such a teaching by Brogdon was incorrect as it is not necessary that gears and countershafts lie in the same plane as the cylinder axis. Such a teaching by Brogdon (if correct) would make it impossible to use a single countershaft and a single pair of gears as taught in my invention. Suppose (for example) that the gears 26 and 32 of Brogdon were interconnected by a single new countershaft so as to eliminate gears 20 and 26. In that case, the new countershaft would interfere with the connecting rods and such a machine would be inoperative.

The crankpins 16 of Brogdon and the large end of each con rod constitute rotating weights which should also be balanced in addition to the reciprocating weights. Brogdon does not mention or show the balance of rotating weights. Brogdon (at lines 62 to 64 of Column 2) said "The weighted portions 34 and 36 together, are substantially equal in balance moment to the counterweight 22". In order to balance rotating weights also, it would be necessary for the Brogdon weight 22 to have a larger moment than weights 34 and 36 combined. At lines 24 to 31 of Column 3, Brogdon states that the weights balance reciprocating parts. The Brogdon abstract states this also.

Brogdon shows the thin wafer like weights 22, 24, 28, 36, and 34 attached to gears. Brogdon therefore did not bother to calculate the sizes of weights required to balance an actual engine because, if he did, those weights would become cumbersome in size and bigger than the gears themselves. All weights in Applicant's FIGS. 6 to 10 have been calculated for size to balance a double acting compressor and with crossheads in addition to pistons. Nevertheless, any argument as to patentability of my invention over Brogdon shall take those thin Brogdon weights into account.

OBJECTS AND ADVANTAGES OF MY INVENTION

1. A general object is to impart near perfect balance to an opposed four throw four cylinder machine.

2. A specific object is to balance all the primary inertia force couples caused by the reciprocating parts.

3. Another object is to balance the crankpins and the large ends of the con rods. These are rotating parts which also should be balanced.

4. Both objectives 2 and 3 above are now accomplished using only four rotating weights total (two on the crankshaft and two on a countershaft).

5. Another object is to accomplish the balancing with as few parts as possible and thereby minimize cost and maximize reliability. Only a single countershaft, one pair of gears, and four rotating weights are now employed to secure the balancing in a four throw machine.

6. Another object is to orient all four rotating weights in their correct timed angular directions (relative to the crankshaft). Also, all four rotating weights must be of correct size and axial spacing. All drawings show correct angles, size, and spacing. Also, mathematical procedure examples are provided to secure all of these objectives.

7. Another object is to be able to balance the primary inertia force couples even if one pair of reciprocating parts are heavier than the second pair of reciprocating parts. Drawings and mathematical procedure examples are provided for this.

8. Another object is to balance secondary inertia force couples caused by the reciprocating parts. This objective is accomplished by selecting a particular crank sequence and particular cylinder locations and no other secondary balancing means is required. There is no need for example to employ one or more countershafts running at twice crankshaft RPM.

9. An advantage of this invention is that the two secondary inertia force couples are subtractive and not addative. This results that if the weights of all four reciprocating parts are not equal (as is generally the case) then the remaining secondary couple unbalance is very small (2 to 3 per cent of former total unbalance) as will be described.

10. An advantage is that two pistons reach the end of a compression stroke every 90 degrees of crankshaft rotation. Thus, there is a smooth torque effort with four equally spaced torque impulses per rev. This advantage is not new in itself; but is part of the overall objective to obtain a very smooth running machine.

11. Another object is to be able to retrofit my balancer mechanism to existing unbalanced machines and to incorporate the balancer mechanism into existing production designs—especially for large compressor machinery. The compatability of my balancer mechanism with existing machines and existing designs is a cost and time saving feature.

12. Another object is to be able to retrofit my balancer mechanism to existing machines (even in the field—on the job site) without having to remove the heavy crankshaft from its frame and without unbolting the con rods.

13. Another object is to be able to retrofit main counterweights to existing crankshafts with a simple bolt-on procedure.

14. An advantage of this invention is that it is easy and convenient to change main counterweights from time to time (in case of piston size/weight change). It is not necessary to remove the crankshaft from its frame in order to change counterweights.

15. In the case of FIG. 9, it is possible to retrofit my balancer to existing machines (in the field) without having to drill holes in the end of the crankshaft and without having to relocate an oil pump.

16. In some cases (FIG. 6), it is desirable to mount the main counterweight 47 on the far left end of the crankshaft. It is now possible to retrofit this to existing machines (in the field) without removing the crankshaft from its frame. A drilling fixture (FIG. 20) is provided for this.

17. Another object is to provide a lower cost partial balancer which balances all the rotating weights plus one half the primary inertia force couples.

18. An advantage is that with the addition of my balancer, the inertia forces on crankshaft main bearings are cut 60 per cent.

BRIEF DESCRIPTION OF THE DRAWINGS

FIG. 2 is a partial end view of FIG. 1.

FIG. 3 is a partial section view of FIG. 1 taken perpendicular to the crankshaft and through the center of Crankpin 5. FIGS. 2 and 3 are for the case when all four reciprocating weights are equal.

FIGS. 4 and 5 are similar to FIGS. 2 and 3 except they are for the case wherein one pair of reciprocating weights are heavier than the second pair.

FIG. 10 is a section view of FIG. 9 taken at 10—10 in FIG. 9.

FIG. 11 shows an alternate drive to be used in place of FIG. 10.

FIG. 20 shows a drilling fixture (applied to the end of the crankshaft) for the purpose of drilling and tapping the end of the crankshaft (in an existing machine) without removing the crankshaft from its frame.

DETAILED DESCRIPTION OF FIG. 1

Figure 1:
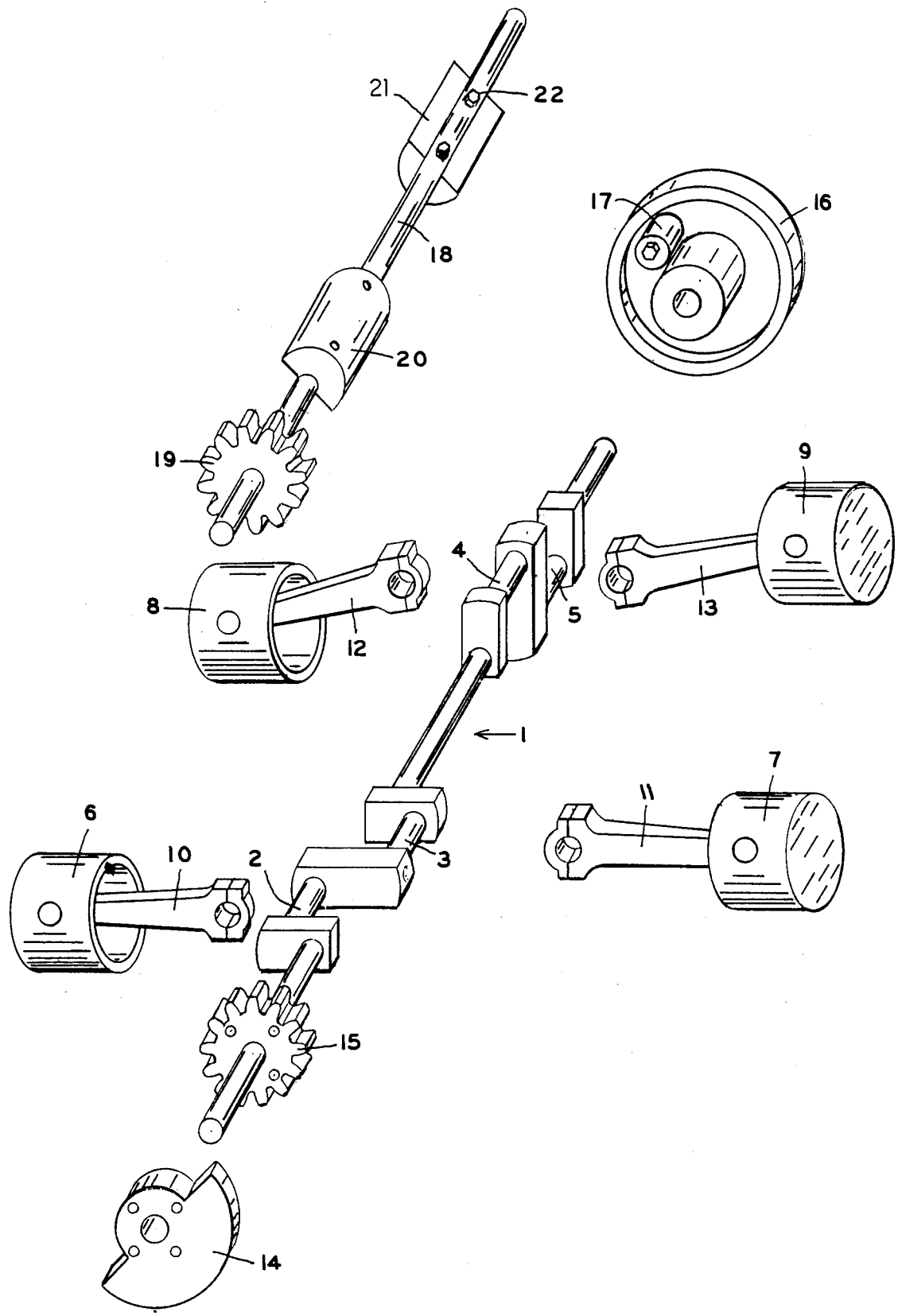
FIG. 1 is an isometric, schematic, exploded view of the moving parts of a four throw machine. All parts on the sheet belong to FIG. 1.

The crankshaft 1 has four throws with crankpins 2 to 5. The crankpins 2 and 3 are disposed 180 degrees from each other about the axis of the crankshaft. The crankpins 4 and 5 are disposed 180 degrees from each other. Crankpin 4 is disposed 90 degrees from crankpin 3. The pistons (or crossheads) 6 to 9 reciprocate in horizontal cylinders (not shown in this Figure). Each piston is connected to its respective crankpin with connecting rods 10 to 13.

The main counterweight 14 fits over the end of the crankshaft and is bolted to the gear 15 which rotates with the crankshaft. The shaft coupling 16 fits tight on the crankshaft and is keyed thereto. Another main counterweight 17 is bolted to the shaft coupling and rotates therewith. The countershaft 18 is mounted directly above the crankshaft and parallel thereto. Gear 19 is mounted rigidly to the countershaft 18 and rotates therewith. Gears 15 and 19 mesh so as to drive the countershaft at the same RPM as the crankshaft but in the opposite direction of rotation. Balance weights 20 and 21 are bolted 22 to the countershaft and rotate therewith.

BALANCING THEORY—REFER TO FIG. 1

Pistons 6 and 7 should have equal recip weights for proper balance. Likewise, pistons 8 and 9 should have equal recip weights for proper balance. For most practical purposes, it is not necessary for all four pistons to have the same weight.

A formula for the unbalance in FIG. 1 (prior to the addition of weights 14, 17, 20, and 21) will next be derived.

Let A=total recip weight (LBS.) driven by each of crankpins 2 and 3.

B=total recip weights (LBS.) driven by each of crankpins 4 and 5.

C=total weight (LBS.) of each crankpin 2 to 5 plus the weight (LBS.) of the large end of each con rod 10 to 13.

D=Crank throw inches=stroke/2

E=Distance (inches) from the center of crankpin 2 to the center of crankpin 3 measured parallel to the axis of the crankshaft.

E=Distance (inches) from the center of crankpin 4 to the center of crankpin 5 measured parallel to the axis of the crankshaft. Static moment applied to crank $2=(A+C)\times D=$ LB inches. Same for crank 3.

Dynamic moment of cranks 2 and 3 combined = $(A+C)\times D\times E=$ LB inch$^2$, Dynamic moment of cranks 4 and 5 combined = $(B+C)\times D\times E=$ LB inch$^2$.

Dynamic moment of all four cranks =

$$\sqrt{[(A+C)\times D\times E]^2 + [(B+C)\times D\times E]^2} = \text{LB in}^2$$

This is the peak unbalance for the whole machine (prior to correction) and occurs when all four crankpins are 45 degrees from horizontal. This produces an alternating twisting effort about a vertical axis.

The unbalance is corrected as follows: The rotating unbalance C is corrected by the two counterweights 14 and 17 which supply an equal and opposite couple to that caused by the rotating unbalance C. The primary inertia force couples caused by the reciprocating weights are balanced one half by the counterweights 14 and 17 and one half by the oppositely rotating balance weights 20 and 21.

FIRST NUMERICAL EXAMPLE OF BALANCING FIG. 1

Refer to FIG. 1 and assume as follows: Stroke of each piston is 6 inches. Total reciprocating weight driven by each crank throw=200 LBS. This includes the weight of the small end of the con rod. Assume each crank arm is balanced (in itself) about the axis of the crankshaft. The total weight of each crankpin plus the large end of each con rod=50 LBS. These are the rotating weights which also must be balanced. The axial distance (measured parallel to the axis of the crankshaft) from the center of crankpin 2 to the center of crankpin 3 is 7 inches. The same 7 inch spacing applies also to crank pins 4 and 5.

The axial distance (measured parallel to the axis of the crankshaft) from the center of main counterweight 14 to the center of main counterweight 17 is 40 inches.

The axial distance (measured parallel to the axis of the countershaft 18) from the center of balance weight 20 to the center of balance weight 21 is 30 inches.

The first step will be to calculate the size of the main counterweights 14 and 17 which will balance all the rotating weights plus one half the reciprocating weights. The total weight to be balanced per crank=50+200/2=150 LBS.

Each crank has a throw of 6/2=3 inches.

Static moment to be balanced at each crank=150 LBS×3 inches=450 LB inches. Dynamic moment of each crank pair=450 LB inches×7 inch spacing=3150 LB in$^2$. Dynamic moment of all four cranks=3150×$\sqrt{2}$=4454 LB in$^2$. Note one pair of cranks is 90 degrees out of phase with the other pair, hence the factor $\sqrt{2}$. Static moment of main counterweight 14=4454 LB in$^2$/40 inch spacing=111.3 LB inches. The static moment of main counterweight 17 will also equal the same 111.3 LB inches.

Next, calculate the size of the balance weights 20 and 21. These will balance the remaining half of the reciprocating weights. The total recip weight to be balanced per crank=200/2=100 LBS. Each crank has a throw of 6/2=3 inches. Static moment to be balanced at each crank=100 LBS×3 inches=300 LB inches. Dynamic moment of each crank pair=300 LB inches×7 inch spacing=2100 LB in$^2$. Dynamic moment of all four cranks=2100×$\sqrt{2}$=2969.4 LB in$^2$. Static moment of each balance weight 20 and 21 will be 2969.4 LB in$^2$/30 inch spacing=99 LB inches.

ANGULAR ORIENTATION OF WEIGHTS IN FIGS. 1 TO 3 FOR THIS FIRST NUMERICAL EXAMPLE

The main counterweight 14 is directed downward to the right at a 45 degree angle as shown in FIGS. 1 and 2. The obtuse angle B (in FIG. 2) is 180−45=135 degrees. The obtuse angle B is the angle from the nearest crankpin 2 to the center line of force of counterweight 14. The angle B is measured about the axis of the crankshaft. Likewise, the obtuse angle C (in FIG. 3) is also 135 degrees. The centerline of weight 14 is 180 degrees from the center of weight 17.

The balance weight 20 is directed upward to the right at a 45 degree angle as shown in FIG. 1. The balance weight 21 is directed downward to the left at a 45 degree angle as shown in FIG. 1.

These are the proper orientation of the four weights in FIGS. 1 to 3 relative to the crankshaft and reciprocating parts; and are for the following conditions—(a) Use only two main counterweights 14 and 17, (b) Use only two balance weights 20 and 21 on the countershaft 18, (c) all four recip weights are equal, (d) equal throw per crank, and (e) each crank pair has the same axial spacing.

A SECOND NUMERICAL EXAMPLE—FIGS. 1, 4, AND 5

Two opposing pistons 6 and 7 constitute a pair and their weights should be equal for proper balancing. Likewise, opposing pistons 8 and 9 constitute a second pair and their weights should also be equal. In large double acting compressor machines (FIG. 7), it has been the practice for one pair of pistons 44—44 to be lighter than the second pair of pistons 45—45. It is still possible under this condition to balance the primary inertia couples as will next be explained in the following numerical example: Again refer to FIG. 1. Assume the total reciprocating weight driven by cranks 2 and 3 is 400 LBS. each. Assume the reciprocating weight driven by cranks 4 and 5 is 200 LBS. each. Assume all other parameters are the same as in the first numerical example. Calculate the sizes of main counterweights 14 and 17 first and these again will balance all the rotating weights plus one half of the reciprocating weights. The total weight to be balanced at crank 2 is 50+400/2=250 LBS. The total weight to be balanced at crank 3 is also 250 LBS. Each crank still has a throw of 6/2=3 inches. Static moment to be balanced at crank 2=250 LBS×3 in.=750 LB in. Static moment to be balanced at crank 3 is also 750 LB inches. Axial center to center spacing between cranks 2 and 3 is still 7 inches. Dynamic moment to be balanced due to cranks 2 and 3 combined=750 LB inches×7 inch spacing=5250 LB in$^2$. By a similar calculation, the dynamic moment to be balanced due to cranks 4 and 5 is still 450 LB inches×7 inch spacing=3150 LB in$^2$. The dynamic moment to be balanced due to all four cranks is $\sqrt{5250^2+3150^2}=6122$ LB in$^2$. Static moment of each main counterweight (14 and 17)=6122 LB in$^2$/40 inch spacing=153 LB in.

Next, calculate the size of balance weights 20 and 21. These weights balance one half the reciprocating weight at each crank. The recip weight to be balanced at crank 2=400/2=200 LBS. The recip weight to be balanced at crank 3 is also 200 LBS. Each crank has a throw of 3 inches. So static moment to be balanced at each of cranks 2 and 3=200 LBS×3 inches=600 LB inches. Dynamic moment to be balanced due to cranks 2 and 3=600 LB inch×7 inch spacing=4200 LB in$^2$. The recip wt. to be balanced at each of cranks 4 and 5=200/2=100 LBS and static moment to be balanced at each=100 LBS×3 inches=300 LB inches. Dynamic moment to be balanced due to cranks 4 and 5 combined=300 LB in×7 inch spacing=2100 LB in$^2$. Dynamic moment to be balanced due to all four cranks=$\sqrt{4200^2+2100^2}$=4696 LB in$^2$. Static moment of each balance weights 20 and 21=4696 LB in$^2$/30 inch spacing=156.5 LB in.

ANGULAR ORIENTATION OF WEIGHTS FOR THIS SECOND NUMERICAL EXAMPLE

Next, determine the new angular direction of main counterweights 14 and 17 relative to the crankshaft and with the crankshaft at the rotative position shown in FIG. 1. The cranks 4 and 5 are vertical at this location so they exert no horizontal force or moment. Again, the main counterweights 14 and 17 will balance all the rotating weight (such as crankpins) plus one half the reciprocating weight. Horizontal component of moment at weight $$14 = \frac{(50 + 400/2) \times 3 \times 7}{40} = 131.25 \text{ LB inches.}$$

The total moment of weight 14 (as previously calculated)=153 LB inches. The cosine of 131.25/153=31 degrees; and this is the angle D in FIG. 4. The obtuse angle E becomes 180−31=149°. The weight 17 will be 180 degrees opposite weight 14. The obtuse angle F in FIG. 5 will be 90+31=121°.

Next, determine new angular directions of balance weights 20 and 21 with the crankshaft at the rotative position shown in FIG. 1. Horizontal component of moment at weight $$20 = \frac{400/2 \times 3 \times 7}{30} = 140 \text{ LB INCHES.}$$

The cosine of 140/156.5=27 degrees. Thus, the weight 20 would be directed upward to the right at an angle of 27 degrees from horizontal. Weight 21 would be directed downward to the left and 27 degrees from horizontal.

DETAILED DESCRIPTION OF FIGS. 6, 7, AND 8.

A four throw crankshaft 23 is mounted for rotation in main journal bearings 24 in the frame 25. The various parts of the crankshaft are: end bearing 26, crank webs 27 to 32, crankpins 33 to 36, center section 37, and end bearing 38. Con rods 39, interconnect each crankpin to crossheads 40 via wrist pins 41. The crossheads are guided for reciprocation in the cross head guides 42. Piston rods 43 join each crosshead to double acting compressor pistons 44 to 45. The compressor cylinders and valves are not shown.

A drive gear 46 and main counterweight 47 are fastened to the end of the crankshaft with bolts 48. A second main counterweight 49 is bolted 50 to the shaft coupling 51 (attached to the power input end of the crankshaft 23). Only one half of the shaft coupling is shown as the other half would be mounted on an engine driver or an electric drive motor. Instead of a shaft coupling, the counterweight 49 could be attached to a drive pulley or as a third alternate could be mounted independently on the end of the crankshaft.

A countershaft 52 is mounted for rotation on bearings 53 at a position above and parallel to the crankshaft. The gear 54 is keyed to the countershaft. The two gears 46 and 54 drive the countershaft at crankshaft speed. Balance weights 55 and 56 are bolted 57 to the countershaft. The weights 47, 49, 55, and 56 are all shown in their correct angular positions relative to the crankshaft. The FIG. 6 crankshaft 23 and countershaft 52 are shown at 90 degrees rotation from the FIG. 1 positions.

FOUR ROTATING BALANCE WEIGHTS TOTAL

The four crankpins 33 to 36 and the large ends of the four con rods 39 are heavy rotating weights which must be balanced. The two main counterweights 47 and 49 balance those rotating weights. The two main counterweights 47 and 49 also balance one half the primary inertia force couples caused by the reciprocating parts. It is thus seen that the main counterweights 47 and 49 perform a double function, i.e., they balance both rotating parts and primary couples. This novel feature is not taught by the prior art. The weights 60 and 66 in FIG. 9 perform in a similar fashion.

The other half of the primary couples are balanced by the two balance weights 55 and 56 on the countershaft. The balancing of secondary couples will be described later.

REDUCED INERTIA FORCE ON CRANKSHAFT MAIN BEARINGS

The counterweights 47, 49, 60, and 66 remove all the rotating unbalance consisting of crankpins and large ends of con rods. Those same counterweights also remove one half of the primary inertia force couples. These forces are thus neutralized right at the crankshaft. The net result is that main bearing loads (due to inertia forces) are reduced to about 40% of former amount, The same also applies to FIG. 21.

ACCESSABILITY AND EASE OF CHANGING WEIGHTS

In balancer work, changing weights is the order of the day and not the exception, especially during the early development stage. Also, if pistons are changed, then this may entail a change of recip weights and therefore a change of all four rotating balancer weights. The main counterweight 47 can be changed through the end opening and it is not necessary to remove the countershaft 52. The second main counterweight 49 (on the shaft coupling) is accessable and thus easy to change. The two balance weights 55 and 56 (on the countershaft) can be changed simply by unbolting and it is not necessary to remove the countershaft from its bearing mount. Such weight changing is further aided by the fact that there are only four rotating weights total even though the machine has four throws.

DETAILED DESCRIPTION OF FIGS. 9 AND 10

Figure 6:
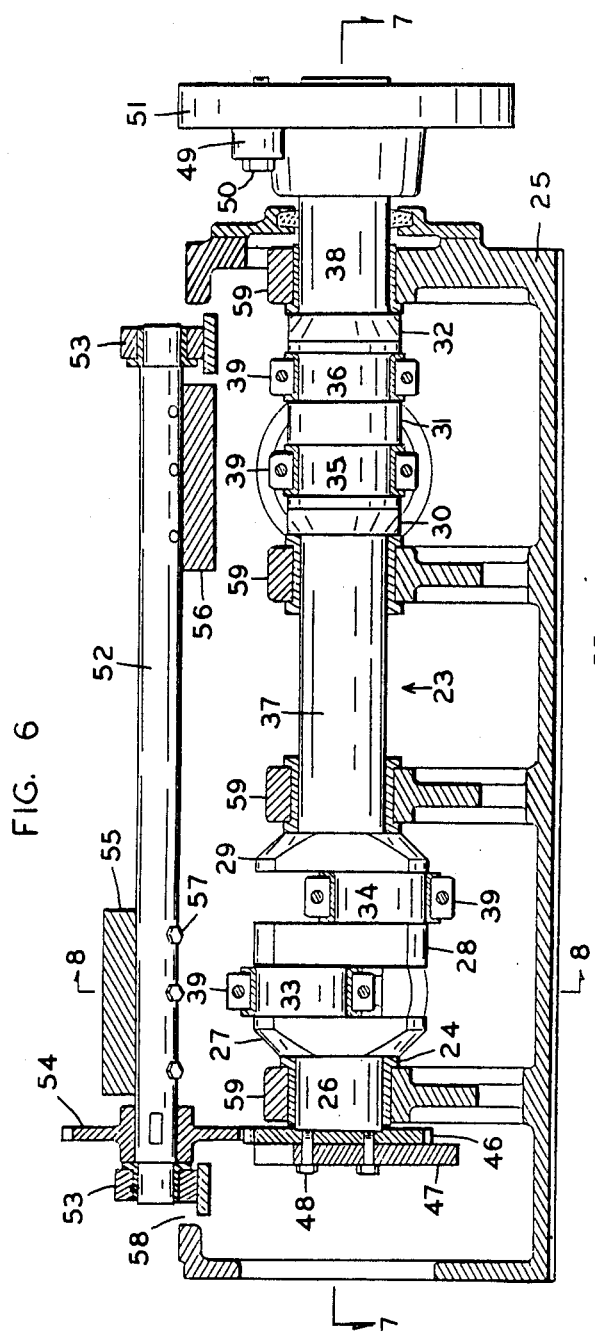
FIG. 6 is a section view of a large double acting four throw compressor machine. The balancing principles for FIG. 6 are the same as those shown schematically in FIG. 1. The section view (in FIG. 6) is taken in a vertical plane through the axes of both the crankshaft and the countershaft.
Figure 9:
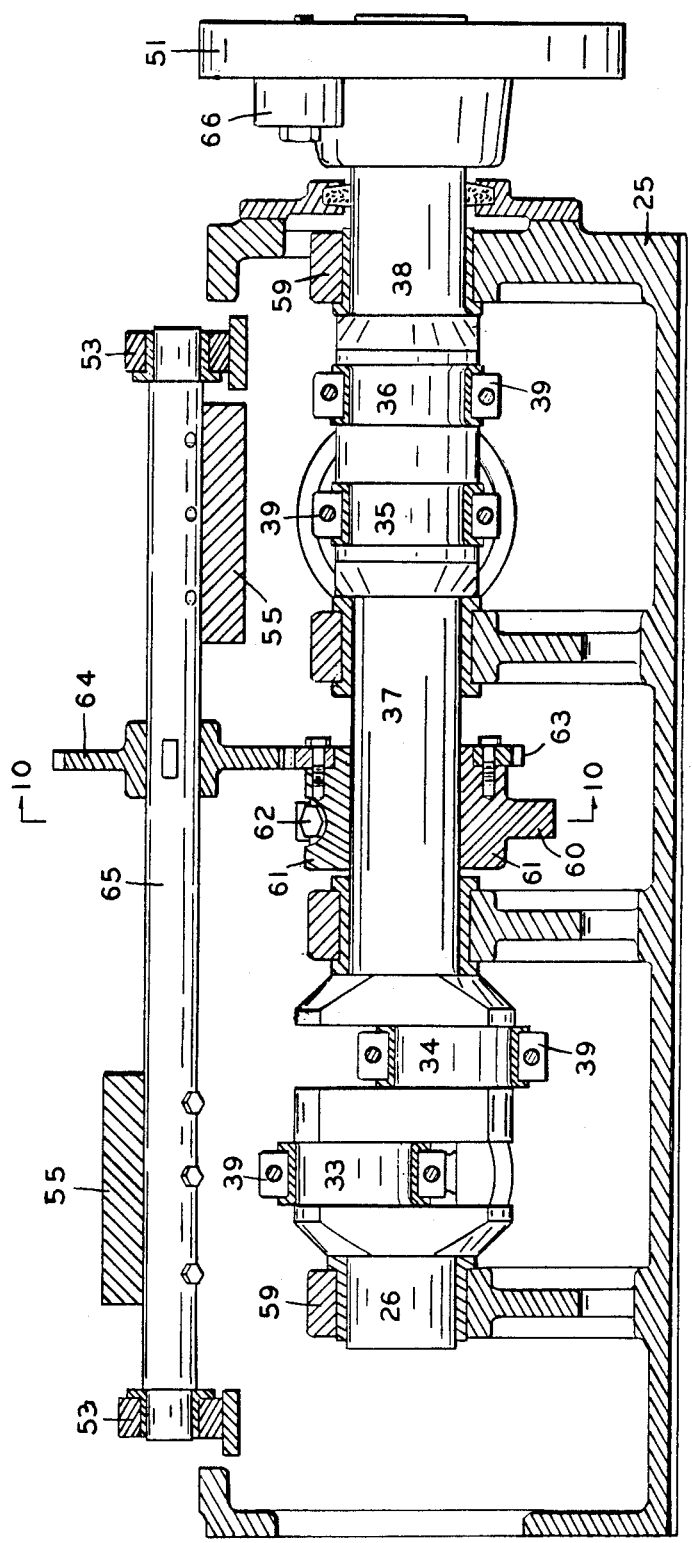
FIG. 9 is similar to FIG. 6 except one main counterweight has been placed at the center of the crankshaft instead of at the end.

FIG. 9 is similar to FIG. 6 except one main counterweight 60 has been placed on the center section 37 of the crankshaft instead of at 47. The hub portion 61 is in two pieces so as to permit assembly onto the crankshaft. The bolts 62 clamp the hub tightly in place and several cup point set screws (not shown) permit further locking. The gear 63 is also two piece and is bolted to the hub. Gear 63 drives gear 64 and countershaft 65.

In FIG. 9, the axial spacing between main counterweights 60 and 66 is smaller than the spacing 47 to 49 in FIG. 6. This means therefore that the main counterweights in FIG. 9 have to be nearly twice as large for FIG. 9 than for FIG. 6. This is no problem as proper sizes have been calculated for specific machines now in production and now in operation in the field. It is further noted, that the two weights 60 and 66 are anti-symetrical (off to one side) about the center of the whole machine. This causes no problem because the weights 60 and 66 are together a couple and therefore their anti-symetrical axial location is correct for proper balancing. The counterweights 60 and 66 and balance weights 55 and 55 are all shown in their correct angular positions relative to the crankshaft. FIG. 10 shows the counterweight 60 to be downward to the left at 45 degrees. The counterweight 66 is 180 degrees from counterweight 60.

The counterweight 66 may be attached to the shaft coupling 51 in one of several ways as follows: Plan No. 1 is to obtain two longer bolts for the shaft coupling (Thomas) itself. Then a crescent shape steel plate would be attached to the shaft coupling using the two longer bolts. Plan No. 2 would be to bolt a split hub over the non-tapered hub of the coupling.

RETROFIT THE BALANCER PARTS TO EXISTING MACHINES AND TO EXISTING DESIGNS

About three years ago, I was asked by a large compressor builder if I could adapt an earlier invention to balance their large double acting four throw oil field compressor. Working entirely on my own time and expense, I finally rejected the earlier invention and came up with the combination shown herein. A principle object was to balance their existing production machine with the least possible changes. To be able to retrofit to existing parts would be ideal.

Figure 8:
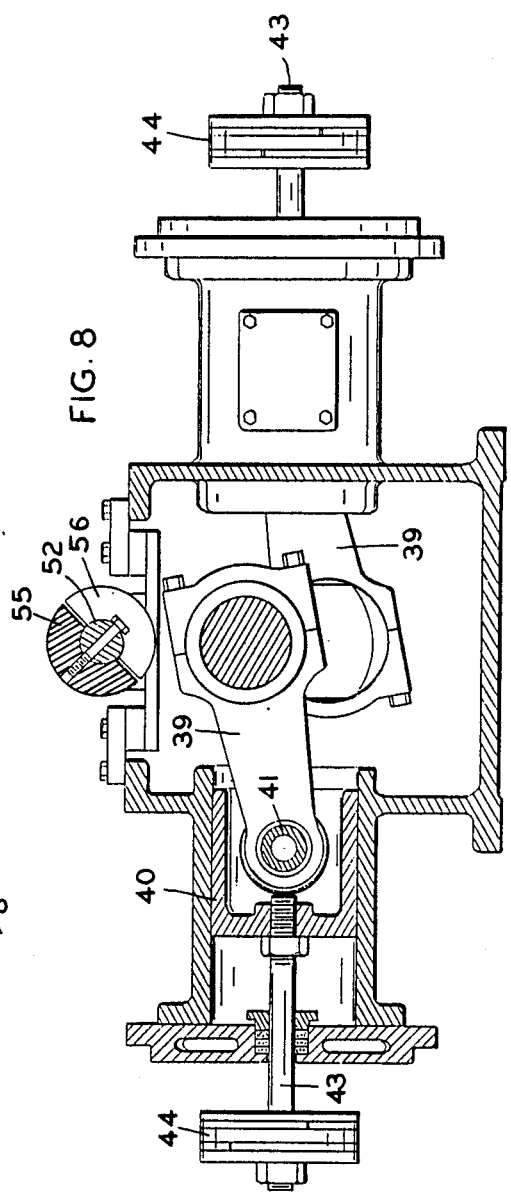
FIG. 8 is a section view taken at 8—8 in FIG. 6.
Figure 7:
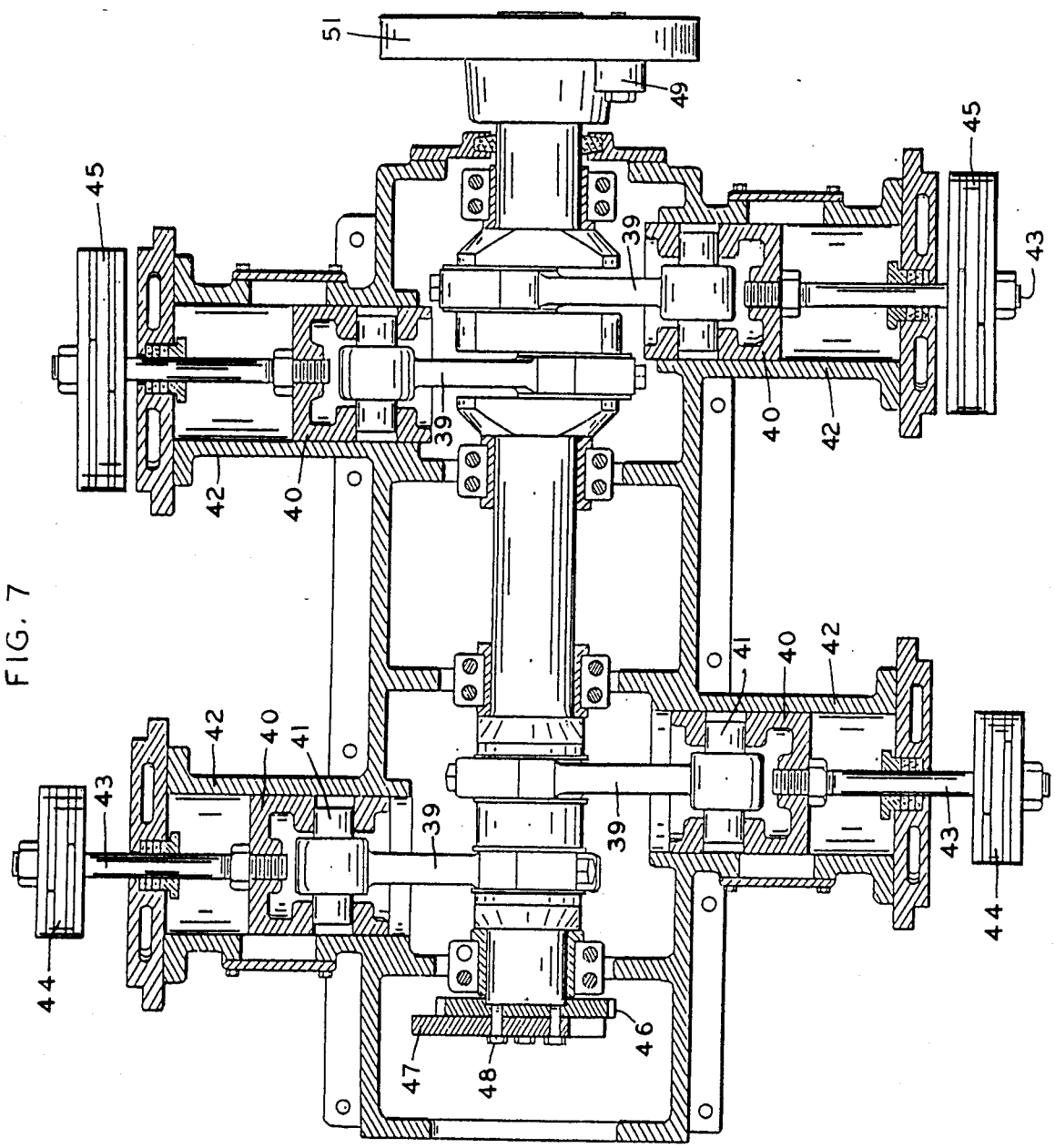
FIG. 7 is a section view taken in a horizontal plane through the axis of the crankshaft—as indicated at 7—7 in FIG. 6.

With FIGS. 6 to 8, it is necessary to drill and tap holes in the end of the crankshaft so as to fasten gear 46 and weight 47 in place. The drilling and tapping can be done in the field without removing the crankshaft from the frame (see FIG. 20).

With FIGS. 9 and 10, it is not necessary to drill holes in the crankshaft (of an existing machine) nor is it necessary to move an oil pump (not shown) further to the left end of the frame 25.

With FIGS. 6 to 8, it is not necessary for the gear 46 to be split in two. Thus, FIGS. 6 to 8 are better suited when constructing from new. FIGS. 9 and 10 are better suited for retrofit to existing machines in the field.

The balancer is compatable with existing designs as follows: No change to any compressor parts such as frame, crankshaft, con rods, crossheads, cylinders, pistons, valves, etc.

It is now possible to retrofit the balancer mechanism to existing machines out in the field under the following conditions: (a) Do not remove the heavy crankshaft from the frame, (b) Do not hire a crane, (c) Do not unbolt the con rod, (d) Do not drill and tap holes in the end of the crankshaft, (e) Do not relocate the oil pump or even tough the oil pump, (f) Do not equalize all four recip weights. Just go with existing balanced pairs as was described under "A SECOND NUMERICAL EXAMPLE".

DETAILED DESCRIPTION OF FIG. 11

This Fig. shows an alternate chain and sprocket drive to use instead of gears. The sprocket 67 is two piece and clamped to the drive shaft. The sprocket 68 is mounted on and rotates with the countershaft 65. The sprocket 69 is an idler. Item 70 is a roller chain. This secures opposite rotation of the countershaft.

DETAILED DESCRIPTION OF FIGS. 12 TO 17—THE BALANCING OF SECONDARY COUPLES IN A FOUR THROW MACHINE

FIGS. 12 to 17 are schematic (single line) drawings of four throw horizontal opposed machines at various rotative positions; and the purpose of FIGS. 12 to 17 is to teach the principle of secondary balancing in a four throw machine such as that shown in FIG. 1. The forces $F_1$ to $F_{12}$ are all secondary reciprocating inertia forces (due to the finite length of the connecting rods) and should not be confused with primary reciprocating forces. If the connecting rod is five times the length of the crank throw, then the secondary forces will be one fifth of the primary forces. The secondary forces have a frequency twice that of the primary forces.

Figure 12:
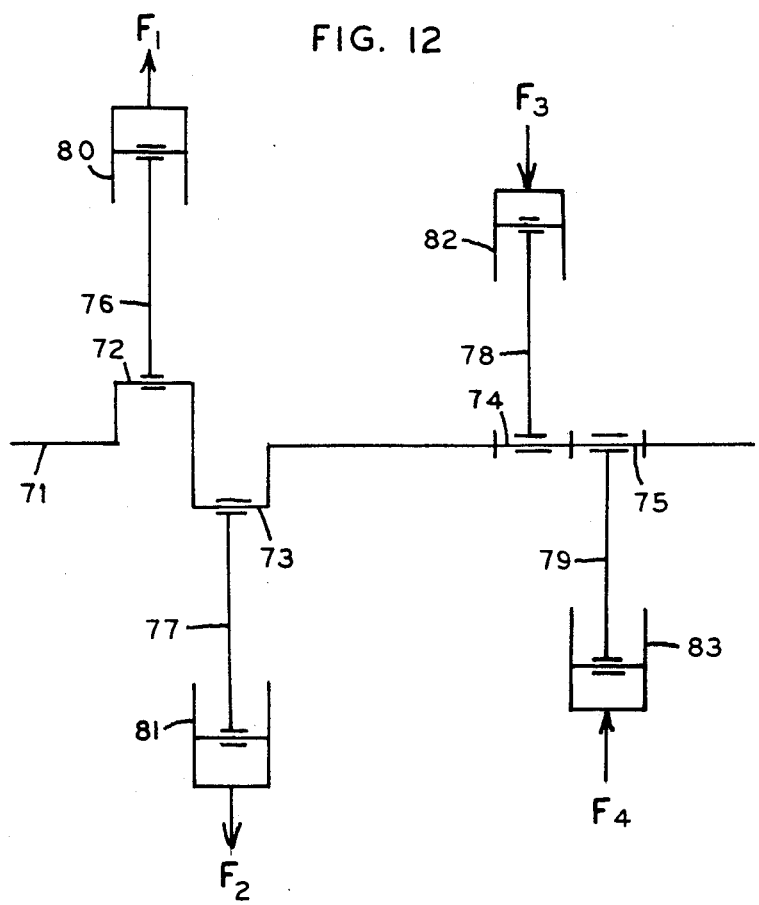
FIG. 12 is a schematic line drawing showing how the secondary couples are balanced.
Figure 13:
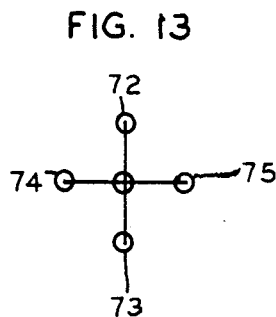
FIG. 13 is an end view of FIG. 12.

In FIGS. 12 and 13, the crankshaft 71 has four throws with crank pins 72 to 75. The crankpins 72 and 73 have their axes in the plane of the paper. FIG. 13 is an end view of the FIG. 12 crankshaft showing crankpin 74 to be vertically upward and crankpin 75 to be vertically downward. Con rods 76 to 79 connect crankpins to respective pistons 80 to 83. Pistons 80 and 81 are both at outer end stroke and their secondary recip inertia forces are represented by $F_1$ and $F_2$. The pistons 82 and 83 are near mid stroke (cranks at 90 degrees) and their secondary recip inertia forces are $F_3$ and $F_4$. $F_1 = F_2 = F_3 = F_4$.

The secondary forces $F_1$ and $F_2$ cause a clockwise force couple. The secondary forces $F_3$ and $F_4$ cause a counterclockwise force couple. Thus, the two couples cancel each other and there are no unbalanced secondary couples in the four throw machine shown in FIGS. 12 and 13.

Figure 14:
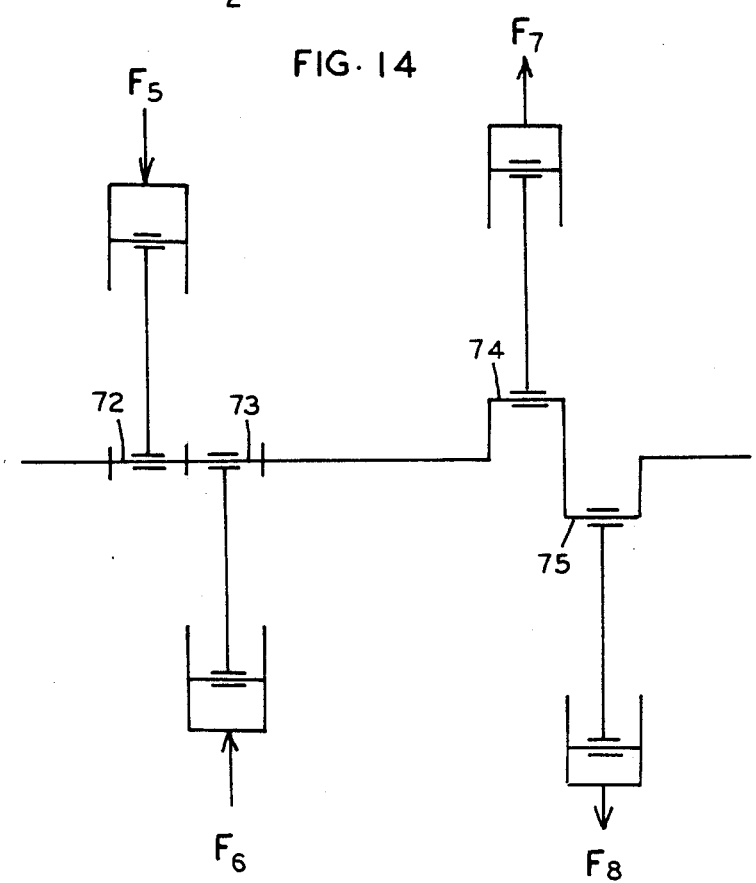
FIGS. 14 and 15 are the same as FIGS. 12 and 13 except the crankshaft has been rotated 90 degrees.
Figure 15:
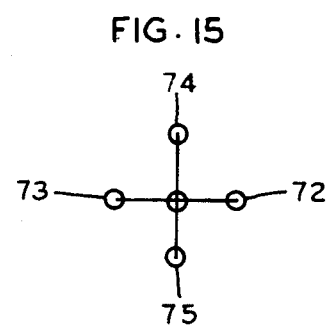

In FIG. 14, the secondary recip inertia forces are $F_5$ to $F_8$. The forces $F_5$ and $F_6$ cause a counterclockwise force couple. The secondary forces $F_7$ and $F_8$ cause a clockwise force couple. Thus the two couples cancel each other and there are no unbalanced secondary couples in FIG. 14.

Figure 16:
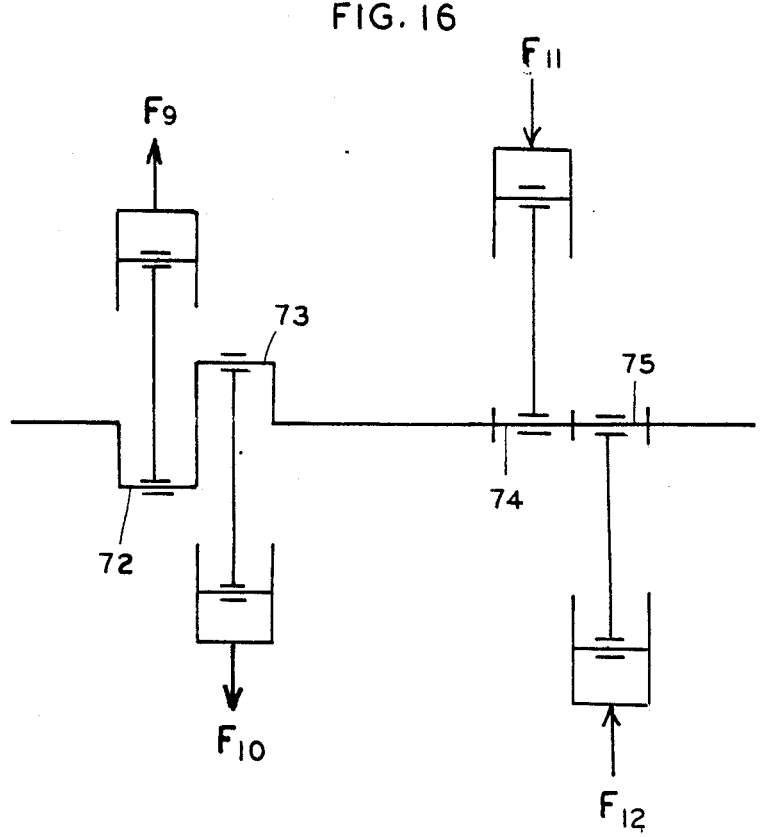
FIGS. 16 and 17 are the same as FIGS. 12 and 13 except the crankshaft has been rotated 180 degrees.
Figure 17:
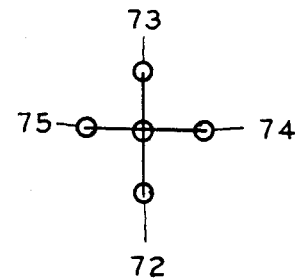
Figure 18:
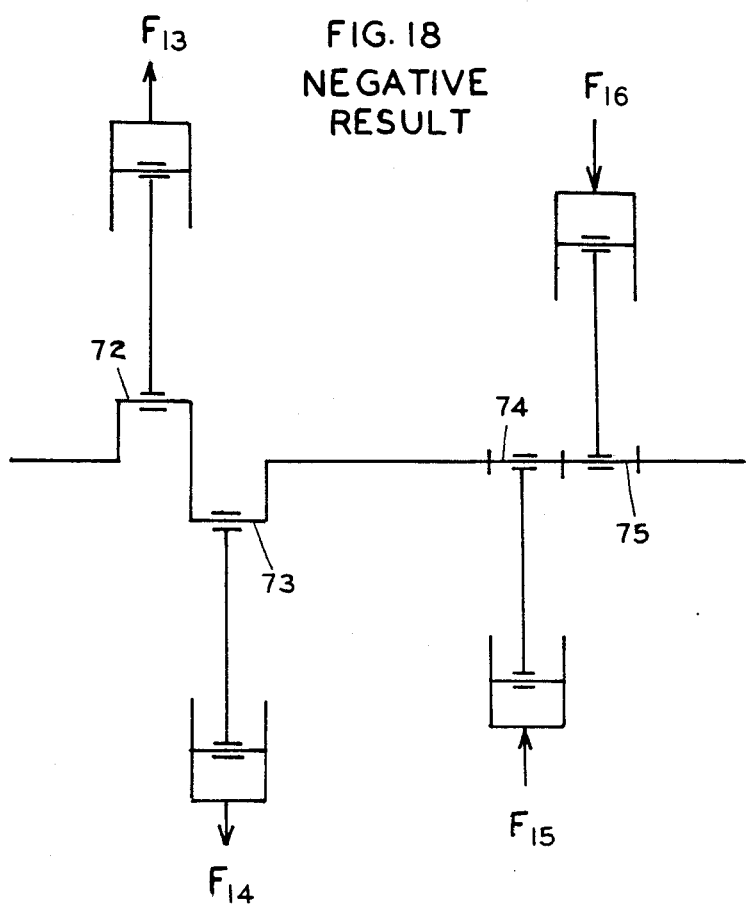
FIGS. 18 and 19 are operable but they would secure negative results and are so marked. These Figs. are shown so as to illustrate what not to do.
Figure 19:
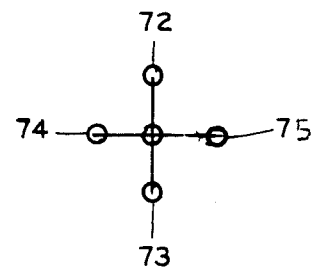

In FIG. 16, the secondary reciprocating inertia forces are $F_9$ to $F_{12}$. The forces $F_9$ and $F_{10}$ cause a clockwise force couple. The forces $F_{11}$ and $F_{12}$ cause a counterclockwise force couple. Thus, the two couples cancel each other and there are no unbalanced secondary couples in FIG. 16.

Refer again to FIG. 12. Assume the crankshaft rotated to a position 45 degrees from that shown in FIG. 12. At that 45 degree position, the secondary reciprocating inertia forces of all four pistons would be zero. Again there would be no unbalanced secondary couples.

It is thus seen that the balancing of secondary couples is made possible by using a particular crank sequence. That is, one opposed crank pair 72 and 73 is 90 degrees out of phase with the second crank pair 74 and 75. If (for example) the four crank pins 72 to 75 all lay in a single plane (the paper) then such secondary balancing would be inoperative as the secondary couples would be addative instead of subtractive. It is noted that the crank sequence shown in FIGS. 1, 6, 7, and 12 to 17 are all the same and that this particular crank sequence is particularly suited for use in a double acting compressor machine because this results in smooth torque effort with four equally spaced crank efforts per rotation of the crankshaft. Such a crank sequence is not suited for a four cylinder four stroke cycle internal combustion engine because it would be uneven firing.

All of the above results in a particularly advantageous combination which is: (a) Smooth torque effort with four equally spaced power strokes per rev. (b) No unbalanced primarys, secondarys, primary couples, or rotating unbalance (such as crankpins), (c) The secondary couples are subtractive and are zero if all four recip weights are equal, and (d) No need of secondary balancing devices such as countershafts running at twice crankshaft speed. These advantages are obtained with the particular crank sequence and cylinder locations taught herein and just any combination will not do.

With double acting compressors as shown in FIG. 7, it has been common practice for two pistons 44 and 44 to be lighter in weight than the other two pistons 45 and 45. With such a combination, it is still possible to balance the primary couples as was described under "A SECOND NUMERICAL EXAMPLE". However, if all four recip weights are not equal, then unbalanced secondary couples still remain. However, the two secondary couples are subtractive from each other and this generally results in a very small remaining unbalance. A typical case is as follows: Recip weight at each of two cranks=500 LBS. recip weight at each of second two cranks=400 LBS, total unbalanced rotating weight per crank=100 LBS, Stroke=5 inches, throw=5/2=2.5 inches, axial space between cranks=6 inches, con rod length=5×throw, Unbalance prior to adding my invention=

$$\sqrt{[(500 + 100) \times 2.5 \times 6]^2 + [(400 + 100) \times 2.5 \times 6]^2} =$$

11715 LB IN².

Unbalance after adding my invention=

$$\frac{500 \times 2.5 \times 6}{5} - \frac{400 \times 2.5 \times 6}{5} = 300 \text{ LB in}^2.$$

Per cent remaining=300/11715=2.6%.

DETAILED DESCRIPTION OF FIGS. 18 AND 19—WHAT NOT TO DO

Secondary forces $F_{13}$ and $F_{14}$ cause a clockwise secondary couple. Secondary forces $F_{15}$ and $F_{16}$ also cause a clockwise secondary couple. Thus, the two secondary couples are addative and not subtractive. This illustrates that a specific crank sequence and specific cylinder locations are required.

COUNTERSHAFT LOCATION

The countershaft 52 is oriented parallel to the crankshaft 23. In FIGS. 6, 8, 9, and 10, the countershafts 52 and 65 are shown mounted directly above the crankshaft. This is done to obtain symmetry and also so the gears 54 and 64 fit inside the large opening 58 in the top of the frame. However, it is possible to shift the countershaft to either side of center and still maintain theoretically perfect balance.

PARTIALLY BALANCED MACHINE—FIG. 21

Figure 21:
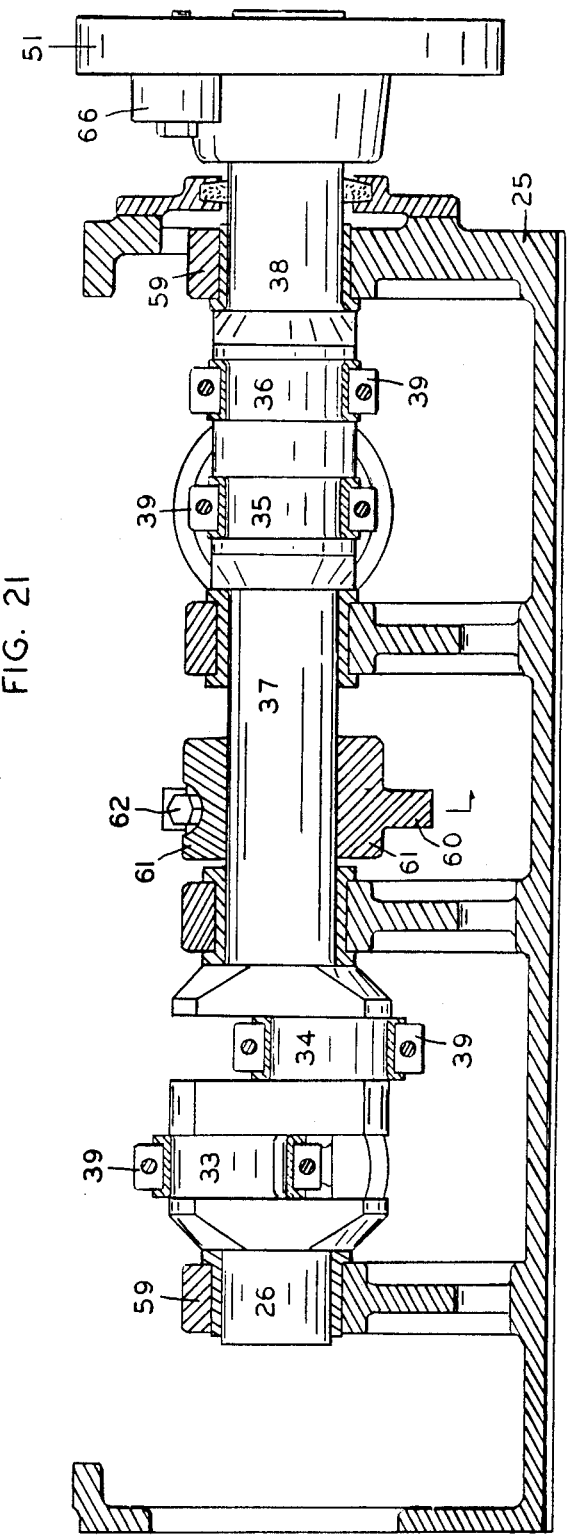
FIG. 21 is the same as FIG. 9 except gears 63-64, countershaft 65, and balance weights 55—55 have been omitted. This results in lower cost partially balanced machines.

FIG. 21 is identical to FIG. 9, except the following parts have been merely omitted: gears 63 and 64, countershaft 65, and two balance weights 55. In FIG. 21, the rotating weights consisting of the four crankpins 33 to 36 and the four large ends 39 of the con rods are still fully balanced by the counterweights 60 and 66. The secondary inertia force couples (in FIG. 21) are also still balanced as was described for FIGS. 12 to 17. However, in FIG. 21, only one half of the primary inertia force couples are still balanced. The net result of such omission of parts is that the peak unbalance for the whole machine is approximately 40% of the former unbalance prior to my invention. In other words, the new counterweights 60 and 66 (just by themselves) get rid of 60% of peak former unbalance.

The following is a tabulation of unbalance in a four throw machine using the same parameters given in the typical case above described.

|  | About a Vertical Axis. LB in² | About a Horizontal Axis. LB in² |
|---|---|---|
| Unbalance prior to my inventions | 11715 | 2121 |
| Unbalance With FIG. 9 | 300 | ZERO |
| Unbalance With FIG. 21 | 4802 | 4802 |

Refer again to FIG. 6. Partial balance can likewise be obtained by omitting gears 46 and 54, countershaft 52, and balance weights 55 and 56 with the same result as just described for FIGS. 9 and 21.

For those cases, where cost is of paramount importance, partial balance as just described is a lower cost alternative. The counter-weights 60 and 66 are easy to retrofit to many existing machines already in the field and in operation. Such retrofit can be easily accomplished without removing the crankshaft from its frame.

DETAILED DESCRIPTION OF FIG. 20

The drilling fixture 84 is clamped on the end of the crankshaft which is then drilled and tapped in the field without removing the existing crankshaft from inside its existing frame. Also, this makes it unnecessary to remove con rod end caps and transport the crankshaft elsewhere for drilling and tapping. A tight fitting plastic barrier 85 and catch tray 86 are pressed over the end of the crankshaft so as to retain drilling chips.

MODIFICATION NOT SHOWN

In some rare cases, it may not be possible to attach a main counterweight 49 or 66 to a shaft coupling 51. In this case, proceed as follows: Attach one main counterweight to the end of the shaft as shown at 47 in FIG. 6. Fasten a second main counterweight 60 to the center section 37 as shown in FIG. 9. This will provide sufficient axial distance between main counterweights. In this case, the counterweight 60 should be rotated to the same angular direction as counterweight 66. Further, the two main counterweights will need slightly bigger static moments due to their smaller axial spacing.

In the description and claims, the word substantially means plus or minus 20 degrees in regard to specified angles.

Several claims specify exactly four bonafide fullsize con rods. These claims are not to be avoided through the use of four full size con rods plus one miniature con rod. The latter item would not be full size nor bonafide. In the claims, an eccentric is the full equivalent of a crankpin.

While the preferred embodiments of this invention have been disclosed, the invention is not limited thereto since it may be otherwise embodied within the scope of the following claims:

I claim:

1. In a reciprocating compressor machine, the combination of: a frame structure, a crankshaft mounted on main bearings for rotation in the frame structure, said crankshaft having four throws with four crankpins, the first said crankpin being located near one end of the crankshaft, the second said crankpin being located further along the crankshaft, the third said crankpin being located still further along the crankshaft, the fourth said crankpin being located toward the other end of the crankshaft, said first and second crankpins being angularly located about the axis of the crankshaft at substantially 180 degrees from each other, said second and third crankpins being angularly located about the axis of the crankshaft at substantially 90 degrees from each other, said third and fourth crankpins being angularly located about the axis of the crankshaft at substantially 180 degrees from each other, four crosshead guides fastened to said frame structure, a first crosshead, a second crosshead, a third crosshead, and a fourth crosshead, each said crosshead being reciprocable in a respective said crosshead guide, at least four connecting rods, each said connecting rod being joined to a respective crosshead with an articulative joint such as a wrist pin, each said connecting rod interconnecting a respective said crankpin to a respective said crosshead for respective rotary and reciprocative motion, said first and second crossheads being mounted in opposed relation on opposite sides of said crankshaft, said third and fourth crossheads being mounted in opposed relation on opposite sides of said crankshaft, said first and second crossheads being adapted to arrive at the outer ends of their reciprocative strokes at substantially the same time, said third and fourth crossheads being adapted to arrive at the outer ends of their reciprocative strokes at substantially the same time, said first crosshead and said third crosshead being mounted on one side of said crankshaft, said second crosshead and said fourth crosshead being mounted on the other side of said crankshaft, a first piston, a second piston, a third piston, and a fourth piston, each said piston being attached to a respective crosshead and reciprocable therewith, said first and second crossheads being offset from each other because their respective said crankpins are axially spaced along the crankshaft, said third and fourth crossheads being offset from each other because their respective said crankpins are axially spaced along the crankshaft, said first and second crossheads (with pistons attached) having the usual primary inertia force couples and secondary inertia force couples caused by said offset locations, said third and fourth crossheads (with pistons attached) having the usual primary inertia force couples and secondary inertia force couples caused by said offset locations, said secondary inertia force couples (in each case) being additionally caused by the finite lengths of said connecting rods, and wherein the improvements comprises the following in combination:

the total number of functioning full size said connecting rods in said compressor machine being exactly four, the total number of functioning full size said crossheads in said compressor machine being exactly four, the use of four connecting rods and four crossheads all located and timed (as specified in this claim) causes the two said secondary inertia force couples to act in opposite directions from each other (at the same time) and therefore counterbalance each other, at least two counterweights fastened to said crankshaft and rotatable therewith, at least two balance weights mounted for rotation relative to said frame structure, said balance weights having their axes of rotation offset from and substantially parallel to the axis of said crankshaft, positive tooth means for driving said balance weights at the same RPM as said crankshaft and in the opposite direction of rotation to that of the crankshaft, and said counterweights on the crankshaft and said offset balance weights serving to balance both of said primary inertia force couples.

2. The combination specified in claim 1 wherein:

said counterweights (on the crankshaft) have sufficient dynamic moment so as to balance substantially half of said primary inertia force couples, said offset balance weights have sufficient dynamic moment so as to balance substantially the other half of said primary inertia force couples, the weights of said crankpins and the weights of the large ends of said connecting rods cause rotating centrifugal force couples which should be balanced, said counterweights having additional dynamic moment so as to also substantially balance said rotating centrifugal force couples, the term "dynamic moment" is defined as the weight (LBS/grams) of a counterweight multiplied by the radial distance (inches/centimeters) from the axis of rotation of the crankshaft to the center of gravity of the counterweight multiplied by the axial distance (inches/centimeters) between the center of gravity of the counterweight and the center of gravity of a second counterweight, the term "dynamic moment" is also defined as the weight (LBS/grams) of a balance weight multiplied by the radial distance (inches/centimeters) from the axis of rotation of the balance weight to the center of gravity of the balance weight multiplied by the axial distance (inches/centimeters) between the center of gravity of the balance weight and the center of gravity of a second balance weight, and wherein said dynamic moment of said counterweights exceeds said dynamic moment of said balance weights.

3. The combination specified in claim 1 wherein; one of said counterweights is mounted at an obtuse angle relative to said first crankpin, said obtuse angle being measured about the axis of the crankshaft, and said obtuse angle being 115 degrees to 155 degrees, and the second said counterweight is located substantially 180 degrees (about the axis of the crankshaft) from the first said counterweight.

4. The combination specified in claim 1 wherein; a drilling fixture is attached temporarily to the oil pump end of the crankshaft for the purpose of drilling holes in the end of the crankshaft while the crankshaft remains in its position inside said frame structure, and wherein one of said counterweights is fastened to the crankshaft using said drilled holes.

5. In a reciprocating compressor machine, the combination of a frame structure, a crankshaft mounted on main bearings for rotation in the frame structure, said crankshaft having four throws with four crankpins,
   the first said crankpin being located near one end of the crankshaft, the second said crankpin being located further along the crankshaft the third said crankpin being located still further along the crankshaft, the fourth said crankpin being located toward the other end of the crankshaft,
   said first and second crankpins being angularly located about the axis of the crankshaft at substantially 180 degrees from each other, said second and third crankpins being angularly located about the axes of the crankshaft at substantially 90 degrees from each other, said third and fourth crankpins being angularly located about the axis of the crankshaft at substantially 180 degrees from each other,
   four crosshead guides fastened to said frame structure,
   a first crosshead, a second crosshead, a third crosshead and a fourth crosshead, each said crosshead being reciprocable in a respective said crosshead guide,
   four connecting rods, each said connecting rod being joined to a respective crosshead with an articulative joint such as a wrist pin, each said connecting rod interconnecting a respective said crankpin to a respective said crosshead for respective rotary and reciprocative motion,
   said first and second crossheads being mounted in opposed relation on opposite sides of said crankshaft, said third and fourth crossheads being mounted in opposed relation on opposite sides of said crankshaft,
   said first and second crossheads being adapted to arrive at the outer ends of their reciprocative strokes at substantially the same time, said third and fourth crossheads being adapted to arrive at the outer ends of their reciprocative strokes at substantially the same time,
   said first crosshead and said third crosshead being mounted on one side of said crankshaft, said second crosshead and said fourth crosshead being mounted on the other side of said crankshaft,
   a first piston, a second piston, a third piston, and a fourth piston, each said piston being attached to a respective crosshead and reciprocable therewith,
   said first and second crossheads being offset from each other because their respective said crankpins are axially spaced along the crankshaft, said third and fourth crossheads being offset from each other because their respective said crankpins are axially spaced along the crankshaft,
   said first and second crossheads (with pistons attached) having the usual primary inertia force couples caused by said offset locations, said third and fourth crossheads (with pistons attached) having the usual primary inertia force couples caused by said offset locations,
   a first counterweight and a second counterweight fastened to said crankshaft and rotatable therewith,
   at least two balance weights mounted for rotation relative to said frame structure, said balance weights having their axes of rotation offset from and substantially parallel to the axis of said crankshaft, positive tooth means for driving said balance weights at the same RPM as said crankshaft and in the opposite direction of rotation to that of the crankshaft,
   said counterweights on the crankshaft and said offset balance weights serving to balance both of said primary inertia force couples,
   and wherein the improvement is, said first counterweight being fastened near one end of said crankshaft and rotatable therewith, and said second counterweight being mounted on the crankshaft between said second and third crankpins.

6. The combination specified in claim 5 wherein said counterweights on the crankshaft serve to balance all three of the following items: (1) the weights of said crankpins, (2) the weights of the large ends of said connecting rods, and (3) substantially one half of said primary inertia force couples.

7. The combination specified in claim 5 wherein said second counterweight has a split hub making it possible to assemble the counterweight onto the crankshaft, and wherein a split toothed wheel is fastened to said split hub, and wherein said toothed wheel is a component part of said positive tooth means.

8. The combination specified in claim 7 wherein said split toothed wheel is a sprocket,
   said positive tooth means also includes: a second sprocket attached to said countershaft and rotatable therewith, an idler wheel above said second sprocket and offset therefrom, a flexible toothed element trained over both of said sprockets and the idler wheel, said first sprocket engaging said flexible toothed element on a front face, and said second sprocket engaging said flexible toothed element on its back face, all so as to drive said countershaft in the opposite direction from the crankshaft.

9. The combination specified in claim 5 wherein a shaft coupling is attached to the power input end of said crankshaft, said shaft coupling being adapted to transmit rotary shaft power to said crankshaft, and wherein said first counterweight is attached to said shaft coupling and rotatable therewith.

10. The combination specified in claim 9 wherein said frame structure has a removable top so that it is possible to retrofit assemble said second counterweight onto a said crankshaft while the crankshaft is located in place inside said frame structure, and wherein said first counterweight is capable of being fastened onto said shaft coupling while said shaft coupling is already in place on said crankshaft.

11. In a reciprocating compressor machine, the combination of a frame structure, a crankshaft mounted on main bearings for rotation in the frame structure, said crankshaft having four crank throws, each said crank throw having crank webs and a crankpin,
   the first said crank throw being located near one end of the crankshaft, the second said crankthrow being located further along the crankshaft, the third said crankthrow being located still further along the crankshaft, the fourth said crankthrow being located towards the other end of the crankshaft, the first said crankthrow having a first crankpin, the second said crankthrow having a second crankpin, the third said crankthrow having a third crankpin, the fourth said crankthrow having a fourth crankpin, said first and second crankpins being angularly located about the axis of the crankshaft at substantially 180 degrees from each other, said second and third crankpins being angularly located about the axis of the crankshaft at substantially 90 degrees from each other, said third and fourth crankpins being angularly located about the axis of the crankshaft at substantially 180 degrees from each other, at least four crosshead guides fastened to said frame structure, a first crosshead, a second crosshead, a third crosshead and a fourth crosshead, each said crosshead being reciprocable in a respective said crosshead guide, four connecting rods, each said connecting rod being joined to a respective crosshead with an articulative joint such as a wrist pin, each said connecting rod interconnecting a respective said crankpin to a respective said crosshead for respective rotary and reciprocative motion, said first and second crossheads being mounted in opposed relation on opposite sides of said crankshaft, said third and fourth crossheads being mounted in opposed relation on opposite sides of said crankshaft, said first and second crossheads being adapted to arrive at the outer ends of their reciprocative strokes at substantially the same time, said third and fourth crossheads being adapted to arrive at the outer ends of their reciprocative strokes at substantially the same time, said first crosshead and said third crosshead being mounted on one side of said crankshaft, said second crosshead and said fourth crosshead being mounted on the other side of said crankshaft, a first piston, a second piston, a third piston, and a fourth piston, each said piston being attached to a respective crosshead and reciprocable therewith, said first and second crossheads being offset from each other because their respective said crankpins are axially spaced along the crankshaft, said third and fourth crossheads being offset from each other because their respective said crankpins are axially spaced along the crankshaft, said first and second crossheads (with pistons attached) having the usual primary inertia force couples caused by said offset locations, said third and fourth crossheads (with pistons attached) having the usual primary inertia force couples caused by said offset locations, said crankshaft having a center section located between said second crankthrow and said third crankthrow, a first counterweight and a second counterweight fastened to said crankshaft and rotatable therewith, and wherein the improvement comprises the following in combination:

said first counterweight being fastened to the crankshaft near an end of the crankshaft at an axial location outward from all of said crankthrows, said second counterweight being fastened to said center section of the crankshaft, said counterweights serving to balance a portion of said primary inertia force couples, and wherein the total number of functioning full size said connecting rods in said machine is exactly four.

12. The combination specified in claim 11 wherein:
one end of said crankshaft is the power input end where rotary torque power is applied to drive the crankshaft, and said first counterweight is fastened to the power input end of the crankshaft at an axial location outboard of the closest said main bearing.

13. The combination specified in claim 12 wherein:
a shaft coupling is attached to said power input end of the crankshaft for the purpose of transmitting rotary power into the crankshaft, and wherein said first counterweight is attached to said shaft coupling and rotatable therewith.

14. The combination specified in claim 11 wherein:
the weight of said crankpins and the weight of the large ends of said connecting rods cause rotating centrifugal force couples which should be balanced, said counterweights having sufficient dynamic moment so as to balance substantially one half of said primary inertia force couples, said counterweights having additional dynamic moment so as to also substantially balance said rotating centrifugal force couples, and wherein the term "dynamic moment" is defined as the weight of a counterweight multiplied by the radial distance from the axis of the crankshaft to the center of gravity of the counterweight multiplied by the axial distance (along the axis of the crankshaft) from the center of gravity of one said counterweight to the center of gravity of another said counterweight.

15. The combination specified in claim 11 wherein:
said frame structure has an open top permitting installation of said second counterweight while the crankshaft remains in place inside said frame, and said second counterweight has a multipiece separable hub portion and is thus capable of being fastened onto said crankshaft while the crankshaft remains inside said frame.

16. In a reciprocating machine, the combination of a frame structure, a crankshaft mounted on main bearings for rotation in the frame structure, said crankshaft having at least four throws with at least four crankpins, the first said crankpin being located near one end of the crankshaft, the second said crankpin being located further along the crankshaft, the third said crankpin being located still further along the crankshaft, the fourth said crankpin being located toward the other end of the crankshaft, said first and second crankpins being angularly located about the axis of the crankshaft at substantially 180 degrees from each other, said second and third crankpins being angularly located about the axis of the crankshaft at substantially 90 degrees from each other, said third and fourth crankpins being angularly located about the axis of the crankshaft at substantially 180 degrees from each other, at least four crosshead guides fastened to said frame structure, a first crosshead, a second crosshead, a third crosshead, and a fourth crosshead, each said crosshead being reciprocable in a respective said crosshead guide, at least four connecting rods, each said connecting rod being joined to a respective crosshead with an articulative joint such as a wrist pin, each said connecting rod interconnecting a respective said crankpin to a respective said crosshead for respective rotary and reciprocative motion, said first and second crossheads being mounted in opposed relation on opposite sides of said crankshaft, said third and fourth crossheads being mounted in opposed relation on opposite sides of said crankshaft, said first and second crossheads being adapted to arrive at the outer ends of their reciprocative strokes at substantially the same time, said third and fourth crossheads being adapted to arrive at the outer ends of their reciprocative strokes at substantially the same time, said first crosshead and said third crosshead being mounted on one side of said crankshaft, said second crosshead and said fourth crosshead being mounted on the other side of said crankshaft, a first piston, a second piston, a third piston, and a fourth piston, each said piston being attached to a respective crosshead and reciprocable therewith, said first and second crossheads being offset from each other because their respective said crankpins are axially spaced along the crankshaft, said third and fourth crossheads being offset from each other because their respective said crankpins are axially spaced along the crankshaft, said first and second crossheads (with pistons attached) having the usual primary inertia force couples caused by said offset locations, said third and fourth crossheads (with pistons attached) having the usual primary inertia force couples caused by said offset locations, the total number of functioning full size said connecting rods in said machine being exactly four, the total number of functioning full size said crossheads in said machine being exactly four, said machine being a compressor machine as opposed to a four stroke cycle internal combustion engine, at least two of said pistons being double acting and adapted to compress gases on both ends of the pistons, said compressor machine having four compression strokes (substantially equally spaced) per rotation of the crankshaft and thus a smooth torque effort, and wherein the improvement comprises the following in combination:

at least two counterweights fastened to said crankshaft and rotatable therewith, at least two balance weights mounted for rotation relative to said frame structure, said balance weights having their axes of rotation offset from and substantially parallel to the axis of said crankshaft, positive tooth means for driving said balance weights at the same RPM as said crankshaft and in the opposite direction of rotation to that of the crankshaft, and said counterweights and said balance weights serving to balance said primary inertia force couples.

17. In a reciprocating machine, the combination of a frame structure, a crankshaft mounted on main bearings for rotation in the frame structure, said crankshaft having at least four throws with at least four crankpins, the first said crankpin being located near one end of the crankshaft, the second said crankpin being located further along the crankshaft, the third said crankpin being located still further along the crankshaft, the fourth said crankpin being located towards the other end of the crankshaft, said first and second crankpins being angularly located about the axis of the crankshaft at substantially 180 degrees from each other, said second and third crankpins being angularly located about the axis of the crankshaft at substantially 90 degrees from each other, said third and fourth crankpins being angularly located about the axis of the crankshaft at substantially 180 degrees from each other, at least four crosshead guides fastened to said frame structure, a first crosshead, a second crosshead, a third crosshead, and a fourth crosshead, each said crosshead being reciprocable in a respective said crosshead guide, at least four connecting rods, each said connecting rod being joined to a respective crosshead with an articulative joint such as a wrist pin, each said connecting rod interconnecting a respective said crankpin to a respective said crosshead for respective rotary and reciprocative motion, said first and second crossheads being mounted in opposed relation on opposite sides of said crankshaft, said third and fourth crossheads being mounted in opposed relation on opposite sides of said crankshaft, said first and second crossheads being adapted to arrive at the outer ends of their reciprocative strokes at substantially the same time, said third and fourth crossheads being adapted to arrive at the outer ends of their reciprocative strokes at substantially the same time, said first crosshead and said third crosshead being mounted on one side of said crankshaft, said second crosshead and said fourth crosshead being mounted on the other side of said crankshaft, a first piston, a second piston, a third piston, and a fourth piston, each said piston being attached to a respective crosshead and reciprocable therewith, said first and second crossheads being offset from each other because their respective said crankpins are axially spaced along the crankshaft, said third and fourth crossheads being offset from each other because their respective said crankpins are axially spaced along the crankshaft, said first and second crossheads (with pistons attached) having the usual primary inertia force couples caused by said offset locations, said third and fourth crossheads (with pistons attached) having the usual primary inertia force couples caused by said offset locations, at least two counterweights fastened to said crankshaft and rotatable therewith;

and wherein the improvement is:

a countershaft mounted with its axis of rotation offset from and substantially parallel to the axis of said crankshaft, said countershaft being located at a general location which is above the crankshaft, positive tooth means for driving said countershaft at the same RPM as the crankshaft and in the opposite direction of rotation to that of the crankshaft, at least two balance weights attached to said countershaft and rotatable therewith, and wherein said primary inertia force couples of all four crossheads (with pistons attached) are balanced by the combined action of said counterweights and said balance weights.

18. The combination specified in claim 17 wherein said positive tooth means includes a first sprocket attached to said crankshaft and rotatable therewith, a second sprocket attached to said countershaft and rotatable therewith, an idler wheel above said second sprocket and offset therefrom, a flexible toothed element trained over both of said sprockets and the idler wheel, said first sprocket engaging said flexible toothed element on a front face, and said second sprocket engaging said flexible toothed element on its back face, all so as to drive said countershaft in the opposite direction from the crankshaft.

19. The combination specified in claim 17 wherein:
said frame structure has an open top, said countershaft is located above the open top of said frame structure,
said positive tooth means includes a split toothed wheel fastened onto said crankshaft and rotatable therewith, said split toothed wheel is capable of being retrofitted onto said crankshaft while the crankshaft is assembled into the frame structure, said retrofit being made possible by said open top frame and said split in the toothed wheel,
said positive tooth means also includes a second toothed wheel mounted on said countershaft and rotatable therewith, said two toothed wheels interengaging through the open top of the frame structure so as to drive the countershaft,
and wherein said countershaft is capable of being retrofitted onto the top of the frame structure while the crankshaft is already in place inside the frame, and wherein said retrofit capability (of the countershaft) is made possible by said open top frame and said split toothed wheel.

20. The combination specified in claim 19 wherein:
said split toothed wheel is fastened to said crankshaft at an axial location between said second crankpin and said third crankpin.

21. In a reciprocating machine, the combination of a frame structure, a crankshaft mounted on main bearings for rotation in the frame structure, said crankshaft having at least four throws with at least four crankpins,
the first said crankpin being located near one end of the crankshaft, the second said crankpin being located further along the crankshaft, the third said crankpin being located still further along the crankshaft, the fourth said crankpin being located toward the other end of the crankshaft,
said first and second crankpins being angularly located about the axis of the crankshaft at substantially 180 degrees from each other, said second and third crankpins being angularly located about the axis of the crankshaft at substantially 90 degrees from each other, said third and fourth crankpins being angularly located about the axis of the crankshaft at substantially 180 degrees from each other,
at least four crosshead guides fastened to said frame structure,
a first crosshead, a second crosshead, a third crosshead, and a fourth crosshead, each said crosshead being reciprocable in a respective said crosshead guide,
at least four connecting rods, each said connecting rod being joined to a respective crosshead with an articulative joint such as a wrist pin, each said connecting rod interconnecting a respective said crankpin to a respective said crosshead for respective rotary and reciprocative motion,
said first and second crossheads being mounted in opposed relation on opposite sides of said crankshaft, said third and fourth crossheads being mounted in opposed relation on opposite sides of said crankshaft,
said first and second crossheads being adapted to arrive at the outer ends of their reciprocative strokes at substantially the same time, said third and fourth crossheads being adapted to arrive at the outer ends of their reciprocative strokes at substantially the same time,
said first crosshead and said third crosshead being mounted on one side of said crankshaft, said second crosshead and said fourth crosshead being mounted on the other side of said crankshaft,
a first piston, a second piston, a third piston, and a fourth piston, each said piston being attached to a respective crosshead and reciprocable therewith,
said first and second crossheads being offset from each other because their respective said crankpins are axially spaced along the crankshaft, said third and fourth crossheads being offset from each other because their respective said crankpins are axially spaced along the crankshaft,
said first and second crossheads (with pistons attached) having the usual primary inertia force couples caused by said offset locations, said third and fourth crossheads (with pistons attached) having the usual primary inertia force couples caused by said offset locations,
the total number of functioning full size said connecting rods in said machine being exactly four, the total number of functioning full size said crossheads in said machine being exactly four,
and wherein the improvement comprises the following in combination:
at least two counterweights fastened to said crankshaft and rotatable therewith, at least one of said counterweights being fastened near an end of the crankshaft, said end counterweight being mounted with its line of force angularly located about the axis of the crankshaft at an obtuse angle relative to the axis of the closest said crankpin, said obtuse angle being 115 to 165 degrees, and said counterweights serving to balance substantially half of said primary inertia force couples.

22. The combination specified in claim 21 wherein:
at least two balance weights are mounted for rotation relative to said frame structure, said balance weights having their axes of rotation offset from and substantially parallel to the axis of said crankshaft, said two balance weights having their axes of rotation substantially coaxial with each other, positive tooth means for driving said balance weights at the same RPM as said crankshaft and in the opposite direction of rotation to that of the crankshaft, at least one of said balance weights being timed as follows:
when said end counterweight is directed vertically downward, then one of said balance weights (the one closest to the end counterweight) is directed vertically upward,
and said balance weights serving to substantially balance the remaining half of said primary inertia force couples.

* * * * *